US011138324B2

(12) United States Patent
Ylönen (10) Patent No.: US 11,138,324 B2
(45) Date of Patent: Oct. 5, 2021

(54) SECURE COMMUNICATIONS BETWEEN VIRTUAL COMPUTING INSTANCES (71) Applicant: SSH Communications Security OYJ, Helsinki (FI)

(72) Inventor: Tatu Ylönen, Helsinki (FI)

(73) Assignee: SSH Communications Security OYJ, Helsinki (FI)

( * ) Notice: Subject to any disclaimer, the term of this patent is extended or adjusted under 35 U.S.C. 154(b) by 425 days.

(21) Appl. No.: 15/843,236

(22) Filed: Dec. 15, 2017

(65) Prior Publication Data
US 2018/0173885 A1 Jun. 21, 2018

(30) Foreign Application Priority Data

Dec. 15, 2016 (GB) ..................................... 1621325

(51) Int. Cl.
G06F 7/04 (2006.01)
G06F 17/30 (2006.01)
H04N 7/16 (2011.01)
G06F 21/60 (2013.01)
H04L 29/06 (2006.01)
G06F 9/455 (2018.01)

(52) U.S. Cl.
CPC .......... G06F 21/606 (2013.01); G06F 21/602 (2013.01); H04L 63/0428 (2013.01); G06F 2009/45562 (2013.01); G06F 2009/45587 (2013.01)

(58) Field of Classification Search
CPC ................ G06F 21/606; G06F 21/602; G06F 2009/45587; G06F 2009/45562; H04L 63/0428
See application file for complete search history.

(56) References Cited

U.S. PATENT DOCUMENTS

| 8,015,594 | B2 | 9/2011 | Salowey et al. |
| 8,214,884 | B2 | 7/2012 | Xia et al. |
| 8,539,562 | B2 | 9/2013 | Bolik et al. |
| 9,501,304 | B1* | 11/2016 | Powers .................. H04L 67/34 |
| 2014/0019745 | A1* | 1/2014 | Dodgson ............... H04L 63/065 713/150 |
| 2014/0282889 | A1* | 9/2014 | Ishaya ................. H04L 63/0876 726/4 |
| 2015/0381596 | A1* | 12/2015 | Johnson .............. H04L 63/0272 726/6 |

(Continued)

OTHER PUBLICATIONS

Liberios Vokorokos, Anton Baláž, Norbert Adam, Secure Web Server System Resources Utilization, 2015 (Year: 2015).*

(Continued)

Primary Examiner — Amie C. Lin
(74) Attorney, Agent, or Firm — Banner & Witcoff, Ltd.

(57) ABSTRACT

Method and apparatus for virtualized environment where virtual computing instances interface a service platform operated on a physical computing apparatus are disclosed. A new virtual computing instance interfacing the service platform can be created, the created new virtual computing instance belonging to a class of virtual computing instances. At least one security credential is obtained from a storage of security credentials associated with the class of the new virtual computing instance. Data communicated with at least one further computing instance is secured based on the obtained at least one security credential.

22 Claims, 6 Drawing Sheets (56) References Cited

U.S. PATENT DOCUMENTS

2017/0374101 A1* 12/2017 Woolward .............. H04L 63/20

OTHER PUBLICATIONS

May 18, 2018, European Search Report of Application No. 17206910.6.

Aug. 27, 2012, Jong-Sung Yang et al, IP based security architecture of virtual network in cloud computing system, Wireless Communications and Mobile Computing Conference, 2012 8th International IEEE, pp. 709-715.

CSA Cloud Security Alliance, Software-Defined Perimeter for Infrastructure-as-a-Service, Dec. 2016, 40 pages.

CSA Cloud Security Alliance, Software Defined Perimeter Working Group, SDP Specification 1.0, Apr. 2014, 28 pages.

Napier, Robert A., "Secure Automation: Achieving Least Privilege with SSH, Sudo and Setuid," 2004 LISA XVIII, Nov. 14-19, 2004, Atlanta, Georgia, pp. 1-10, https://www.usenix.org/legacy/event/lisa04/tech/full_papers/napier/napier.pdf.

Thorpe, Christopher, "SSU Extending SSH for Secure Root Administration," Proceedings of the Twelfth Systems Administration Conference (LISA '98), Dec. 6-11, 1998, Boston, Massachusetts, pp. 1-11, http://static.usenix.org/event/lisa98/full_papers/thorpe/thorpe.pdf.

* cited by examiner

SECURE COMMUNICATIONS BETWEEN VIRTUAL COMPUTING INSTANCES

FIELD OF THE INVENTION

This disclosure relates to securing data in a virtualized environment where at least one virtual computing instance can interface a service platform provided by a physical computing apparatus.

BACKGROUND

Virtual computing instances can be provided in a cloud environment for performing tasks conventionally provided by particular physical computing devices. Virtual computing instances can comprise virtual machines (VM), containers, microservices, pods, and so on.

Certain problematic issues have been recognized in view of security of communications, in particular in view of communications between newly created virtual computing instances.

SUMMARY

According to an aspect there is provided a method of securing data in virtualized environment where virtual computing instances interface a service platform operated on a physical computing apparatus, the method comprising: creating a new virtual computing instance interfacing the service platform and belonging to a class of virtual computing instances, obtaining at least one security credential from a storage of security credentials associated with the class of the new virtual computing instance, and securing data communicated with at least one further computing instance based on the at least one security credential.

According to another aspect there is provided an apparatus comprising at least one processor and at least one memory including computer program code, wherein the at least one memory and the computer program code are configured, with the at least one processor, to cause the apparatus to: provide a service platform for interfacing at least one created virtual computing instance belonging to a class of virtual computing instances, obtain at least one security credential from a storage of security credentials associated with the class of the new virtual computing instance, and secure data communicated between the created at least one virtual computing instance and at least one further computing instance based on at least one security credential obtained from the storage of security credentials.

According to yet another aspect there is provided a non-transitory computer readable media comprising program code for causing an apparatus operable in a virtualized environment where virtual computing instances interface a service platform operated on a physical computing apparatus, and comprising a processor to perform instructions for: creating a new virtual computing instance interfacing the service platform and belonging to a class of virtual computing instances, obtaining from a storage of security credentials at least one security credential associated with the class of the new virtual computing instance, and securing data communicated with at least one further computing instance based on the at least one security credential.

According to a more specific aspect the class of the new virtual computing instance is determined after the creation of the new virtual computing instance.

A security credential may be selected based on the class associated with the virtual computing instance. A storage of security credentials may be selected based on knowledge of at least one security credential associated with the class. According to a possibility a storage is selected based on the class of the new virtual computing instance.

An identifier may be assigned for the new virtual computing instance. The assigned identifier may be used in obtaining the at least one security credential from the storage of security credentials. The identifier may be determined based on the class of the new virtual computing instance.

The at least one security credential can be obtained from a storage of security credentials provided in connection with the service platform and/or from a storage of security credentials provided remotely from the service platform.

According to an aspect a virtual computing instance comprises a container. A service platform can encrypt data communicated by the container with at least one further virtual computing instance a based on at least one security credential selected by the service platform from a storage of security credentials or received from the storage of security credentials in response to requesting for security credential information from a storage of security credentials.

The at least one further computing instance may also comprise a container. The further container may run on the same service platform provided at least in part by a shared operating system resource. The further container may also run on a different service platform provided at least in part by a different shared operating system resource.

The virtual computing instance may also comprise a virtual machine provided on a shared adaptation layer.

The security credential may comprises one of a key, a Secure Shell (SSH) key, a certificate, and a private key-public key pair. The securing may comprise at least one of encrypting, authentication and/or signing operation based on the at least one security credential.

The classification of virtual computing instances may be based e.g. on grouping of virtual computing instances, type of virtual computing instances, type of access rights of the virtual computing instances, ownership of relevant computing resource, and/or information about a host opening the virtual instances and/or a host calling for the virtual instances.

A control group identifier or a pod identifier may be used in selecting the at least one security credential. The control group identifier may comprise cgroup id.

SUMMARY OF THE DRAWINGS

Various exemplifying embodiments addressing some of the issues are described in the below description and the appended claims, and are illustrated by the attached drawings. Steps and elements may be reordered, omitted, and combined to form new embodiments, and any step indicated as performed may be caused to be performed by another device or module. In the Figures

DETAILED DESCRIPTION

Figure 1:
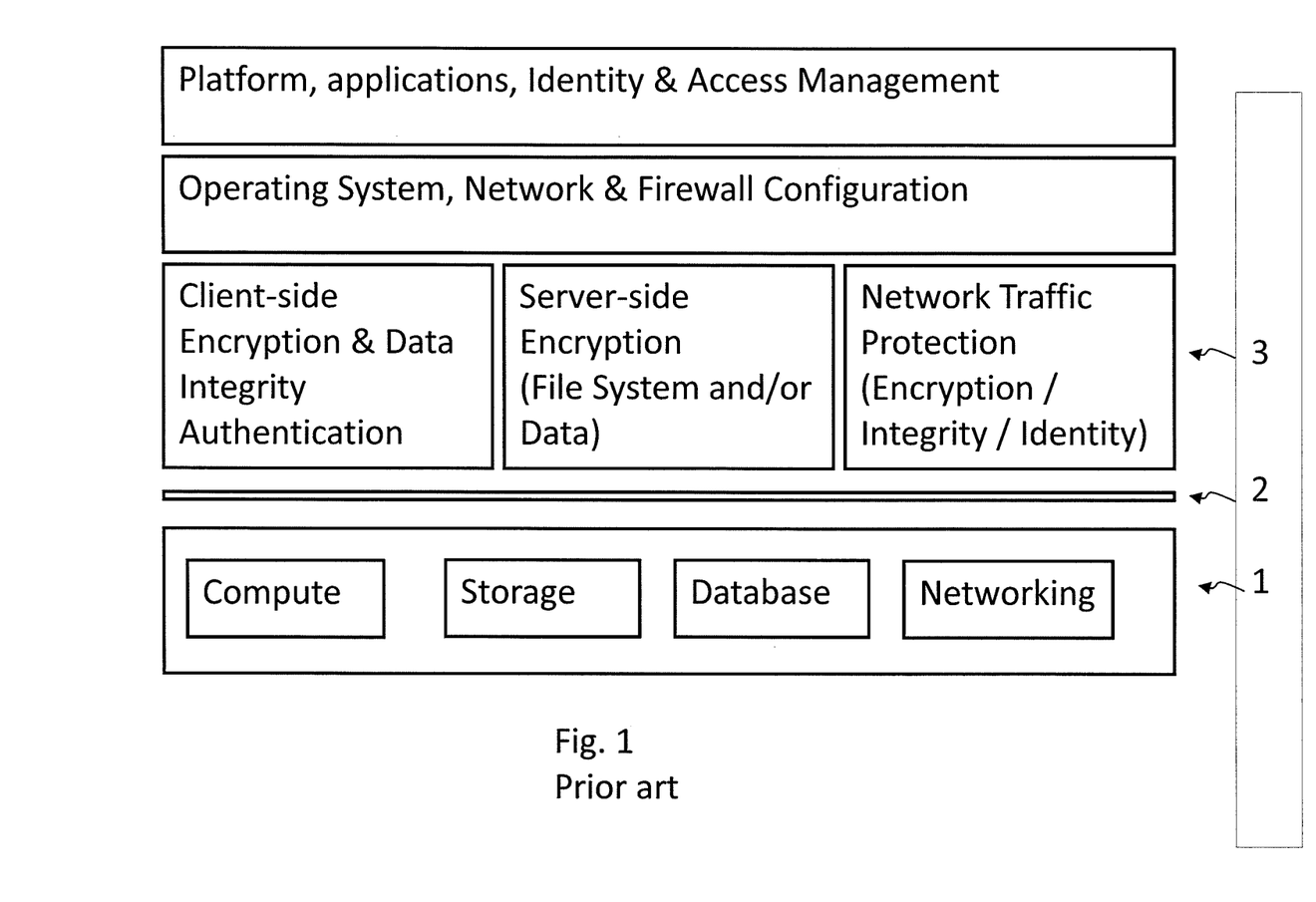
FIGS. 1 and 2 illustrate examples of prior art arrangements.

FIG. 1 shows an example of a possible system architecture for providing virtualized environment. Virtual machines operating is virtualized environment provide functionality of a physical computer by emulating a computer system. Virtual machine (VM) implementations may involve specialized hardware, software, or a combination thereof. In FIG. 1 architecture layer 1 provides the physical computing capability. A virtual layer 3 is above the physical layer for providing the virtual environment. An interface 2 is provided between the physical layer and the virtual layer 3. Each virtual machine runs a unique operating system. A specific software application runs between the hardware and the operating system for creating and running the virtual machines.

A more recent development is operating system level virtualization, also known as containerization. Operating system level virtualization refers to an operating system feature in which a kernel allows the existence of multiple isolated user-space instances, i.e. in operating system level virtualization resources of a computer can be partitioned via the kernel's support for multiple isolated user space instances. Virtual instances sharing operating system resources are called containers, but may also be called partitions, virtualization engines (VEs), jails (FreeBSD jail or chroot jail) and so on. In this specification the term container is used to cover any such partitioned instance.

Containers may look like real computers from the point of view of computer software programs running in them. A software program running on an operating system of a computer can see all resources (e.g. connected devices, files and folders, network shares, central processing unit (CPU) power, quantifiable hardware capabilities and so on) of that computer. However, programs running inside a container can only see the contents of the container and devices assigned to the container.

Containers sit on top of a physical server and the host operating system thereof. Containers can thus be described as simplified virtual machines, a difference to virtual machines being that containers do not have their own operating system. Containers may nevertheless look and feel like real machines to the end users. An advantage of containers is that they are computationally light and quick to start. A characteristic feature of containers is that they are fast to start ("open") for the task or application.

Pods are groups of containers created or destroyed together. A pod typically, but not necessarily, belongs to the same logical application.

Containers may listen on particular Transmission Control Protocol/Internet Protocol (TCP/IP) and/or User Datagram Protocol (UDP) ports and may connect to other TCP/IP and UDP ports. Typically, in container arrangements such as for example Docker™ and orchestration systems such as Kubernetes™, connections between containers are defined in the orchestration framework or when a container is started.

Containers may generally move or be moved between physical computers. The moving may be based on reasons such as resource availability, hardware failures, and so on. Containers may also be restarted when needed. An orchestrator function tracks where each container (or pod) is, and can automatically direct the actual TCP/IP connections between containers to the appropriate servers (IP addresses) and ports. In an orchestration system each container can have an IP address of its own and thus the orchestration system can map a connection between containers to the proper ports and IP addresses.

Virtual computing instances may need to communicate with each other. A cloud service arrangement may be desired where communications between containers are encrypted. Encryption of communications between containers, or other virtual instances, so that data cannot be obtained from the communications by listening to a network or a device providing the instances at any point between containers can however be problematic. Although encryption between containers running within the same host is not considered as critical as encryption between containers running on different hosts, even this may also become a problem in certain circumstances.

Cloud Security Alliance (CSA) has an initiative called Software Defined Perimeter (SDP). The SDP specification version 1.0, April 2014, by the Software Defined Perimeter Working Group of Cloud Security Alliance is incorporated herein by reference. Cloud Security Alliance has also produced document Software-Defined Perimeter for Infrastructure-as-a-Service (Final Draft for Review—December 2016) which is also incorporated herein by reference.

Figure 2:
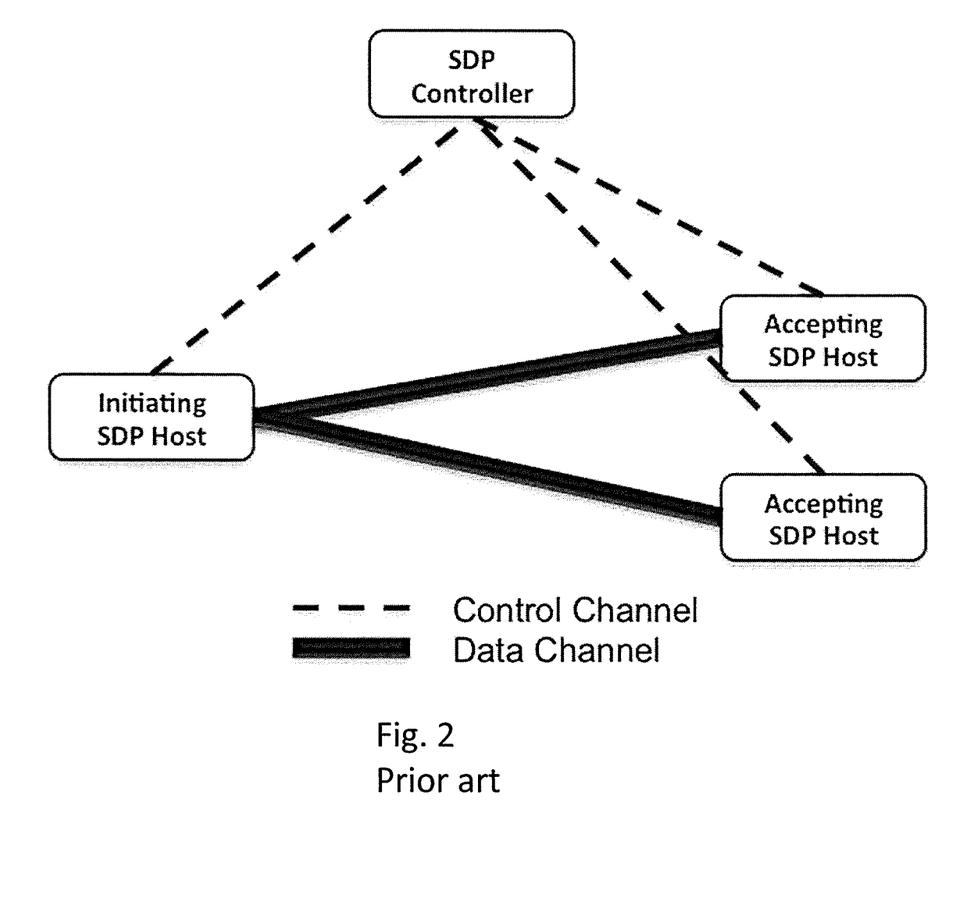

The basic principle of the SDP is shown in FIG. 2. The SDP specification (version 1.0, April 2014) by the CSA does not consider how to provide transparent data encryption to virtual instances such as containers without modifying the containers running in the hosts. Thus the SDP cannot run on just any container but only on containers that have been specially built to support the SDP. The SDP model is basically a host-to-host type encryption solution. However, it has now been recognized that there is a need for a possibility of transparently adding encryption to communications between containers, or other virtual instances.

Figure 3:
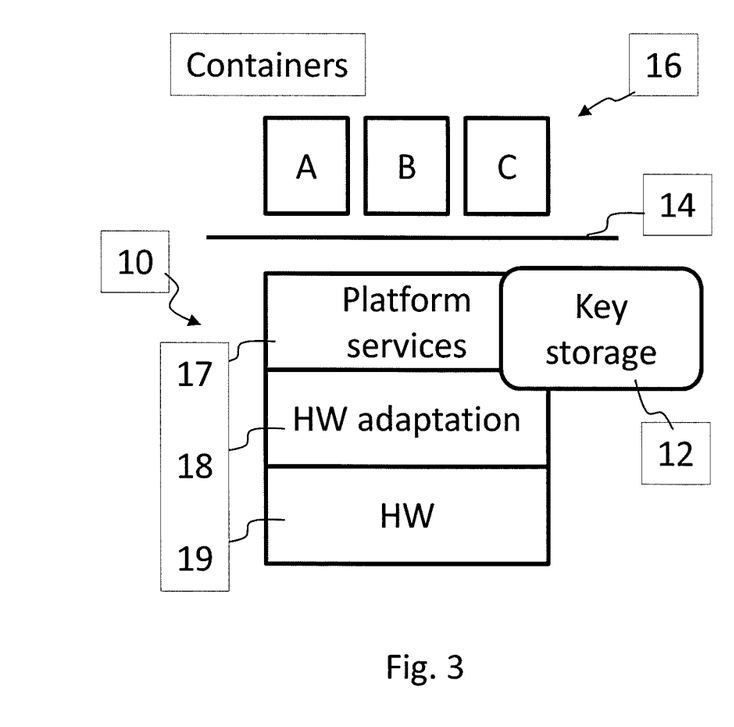
FIGS. 3 and 4 show examples of the herein described principles.
Figure 8:
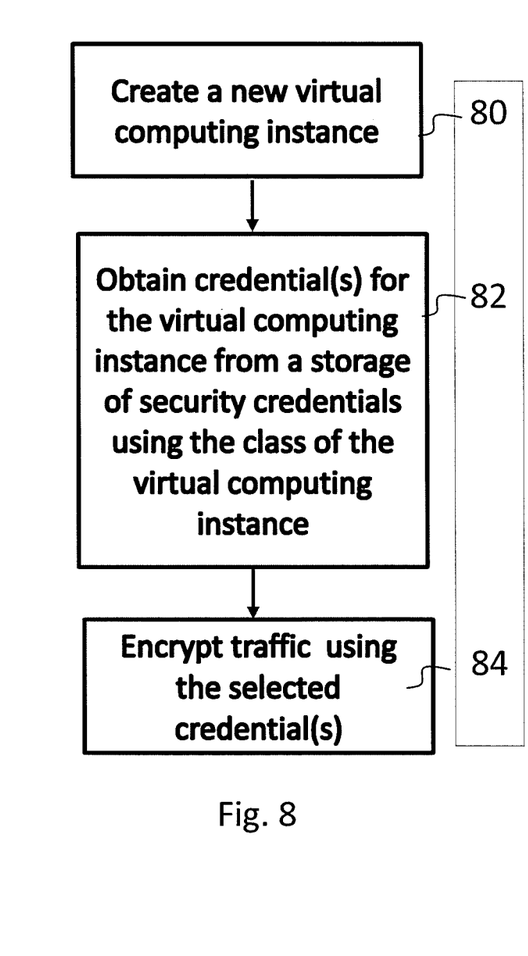

FIG. 3 shows an example of three containers A, B, C (commonly denoted by 16) running on a service platform provided by computing apparatus 10. The computing apparatus 10 can comprise at least one processor and at least one memory, for example as shown in FIG. 8, and appropriate software code. The service platform interfaces (designated by 14) the virtual computing instances 16, or containers in this example. The containers share an operating system, this being denoted by the platform services layer 17 in FIG. 3. The computer apparatus 10 is also shown to provide a hardware adaptation layer 18 and a hardware (HW) layer 19.

In addition, a storage 12 of security credentials is maintained in association with the service platform. According to an embodiment the security credentials comprise keys. The credential storage 12 can be controlled by the operating system running on the platform services layer. Alternatively, a specific software for controlling the storage may be provided. The apparatus is configured to encrypt data communicated between a newly created virtual computing instance and at least one further virtual computing instance based on at least one credential obtained from the storage 12 of security credentials.

A number of credentials can be stored in the storage 12 so that they are ready for use and available for the platform services layer 17 whenever needed by any of the containers 16. A credential can be selected from a storage, or a general request for an appropriate credential can be made to a storage by the platform services layer. A credential may be selected from a storage based on a class determined to be associated with the newly created virtual computing instance. According to a possibility a storage of security credentials may be selected based on knowledge of the at least one security credential associated with the class. According to a possibility a storage is selected based on the class of the new virtual computing instance. For example, if there is an association between a security credential and a class of a new virtual computing instance, such security credential may also be requested based on knowledge of where the security credential is stored, the selected storage being also associated with the class.

Figure 4:
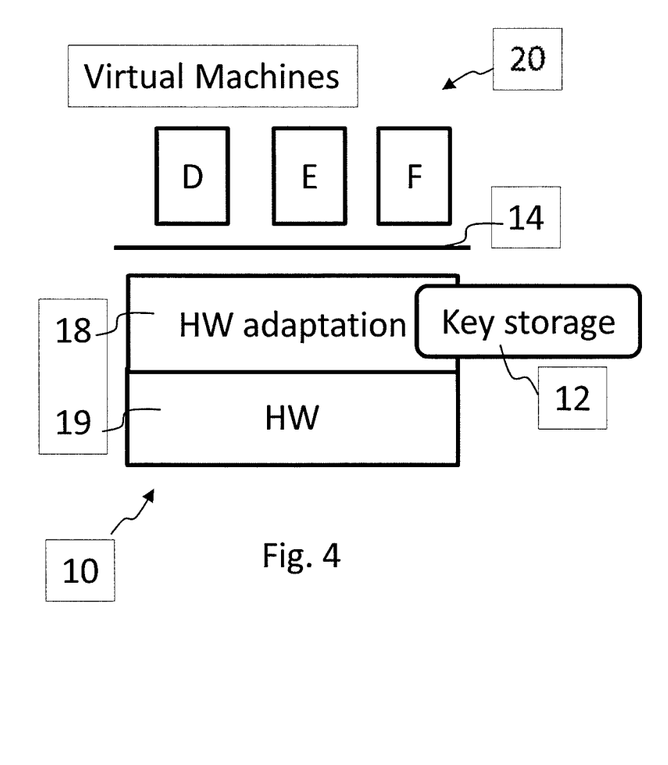

A virtual computing instance may also comprise a virtual machine provided on a shared adaptation layer. In FIG. 4 the virtual computing instances are provided by virtual machines D, E and F, commonly denoted by 20. As each of the virtual machines 20 has its own operating system, the service platform is provided directly by a hardware adaptation layer 18 operated in the apparatus 10. In this example a security credential storage 12 is associated with the hardware adaptation layer 18. A hardware (HW) layer 19 is provided below the hardware adaptation layer 18.

Figure 5:
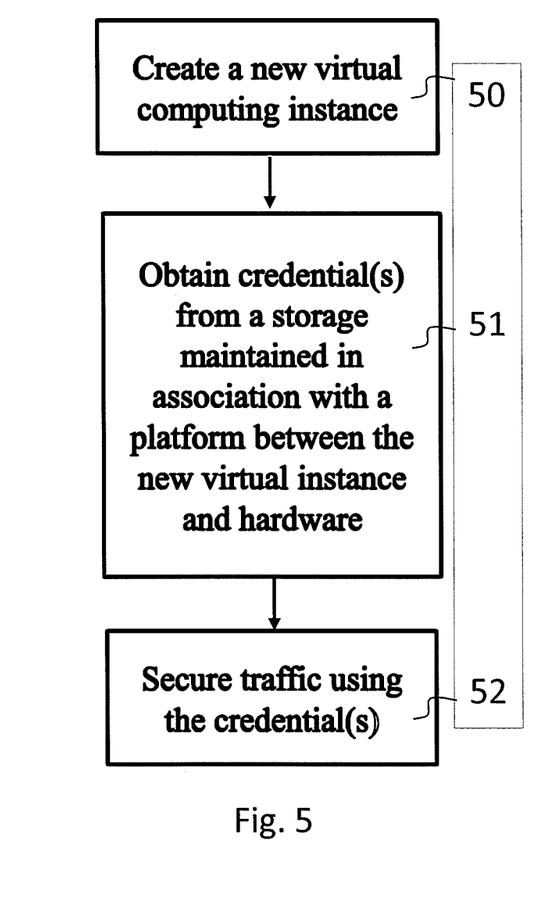
FIGS. 5-8 are flowcharts in accordance with certain embodiments.

FIG. 5 shows in a flowchart an example of a method for securing data communicated in virtualized environment where one or more virtual computing instances interface a service platform operated on a physical computing apparatus. The method comprises creating at 50 a new virtual computing instance. The created virtual instance interfaces the service platform. At least one credential can be obtained at 51 from a storage of security credentials maintained in association with the service platform. Data communicated with another virtual computing instance can then be secured at 52 by encryption based on the at least one credential.

The new virtual computing instance can be classified based on a classification scheme. The classification of virtual computing instances can be based e.g. on at least one of grouping of virtual computing instances, type of virtual computing instances, type of access rights assigned for the virtual computing instances, ownership of relevant computing resource, and information about a host opening the virtual instances and/or a host calling for the virtual instances. Classes can thus be based, e.g., on user or other logical groups of virtual instances. The type of virtual instances can be e.g. container, virtual machine or a subtype within these classes such as caller, receiver, organizer, etc. Classes based on access rights may be based on predetermined rights. For example, only certain containers may call other containers, or virtual machines, and can thus be categorized in an access right class of such instances. Various pieces of ownership information such as private, organization, business, public and so forth may also be used in the classification. Yet another example of basis of classification is information on hosts which call or create containers or virtual machines.

An identifier can be assigned for the new virtual computing instance. Determining of the identifier can be based on the class of the new virtual computing instance. The classification cane be done dynamically by the computing apparatus after the creation of the virtual instance.

The at least one credential can be obtained from the storage of security credentials based on the identifier and/or the class. For example, an appropriate key is selected based on the class. An associated storage of keys may be selected based on knowledge that the storage stores keys associated with the class.

Figure 6:
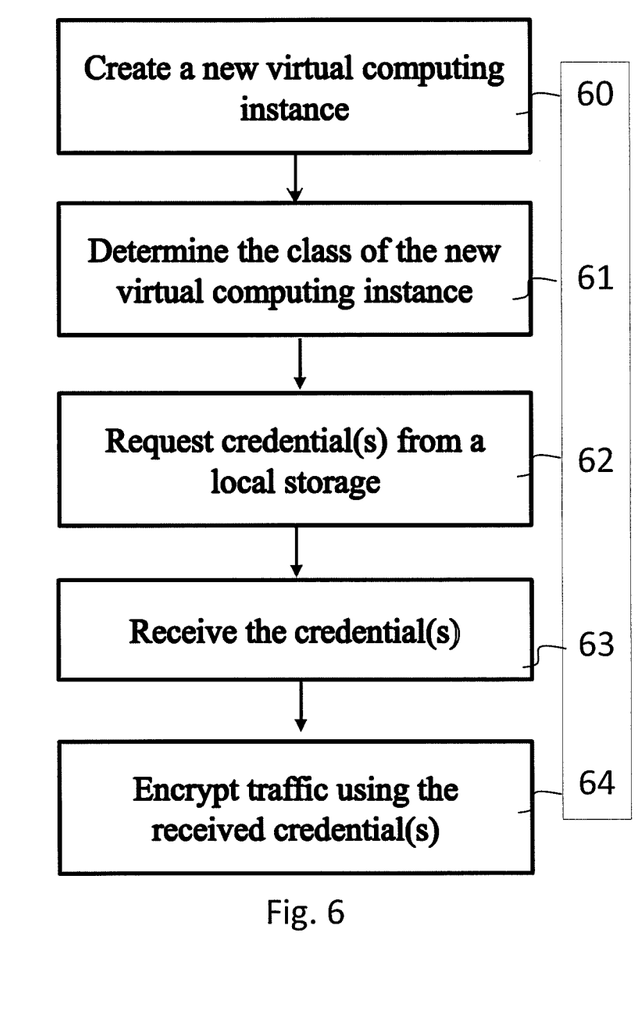

FIG. 6 illustrates a more specific example of a method where the new virtual instance is provided by creation of a new container. The method comprises creating at 60 a new virtual computing instance. After classification at 61 based on predefined criteria at least one credential is obtained from a storage. For example, obtaining can comprise requesting or selecting at least one credential from a local storage associated with the physical computer apparatus at 62. Alternatively, the credential may be obtained from a network server adapted for storing information on security credentials the physical computer apparatus has access to.

The at least one credential is received at 63. Encrypting of data communicated with at least one further virtual computing instance can then be based at 64 on the at least one credential received from the storage of security credentials.

The encryption can be provided by an encryption functionality provided by the service platform. Another possibility is to provide the encryption within the container based on the credentials received from the credential storage.

The virtual computing instance and the other virtual computing instance may both comprise a container. The other container may run on the same service platform provided at least in part by a shared operating system resource. The other container may also run on a different service platform provided at least in part by a different shared operating system resource.

Figure 7:
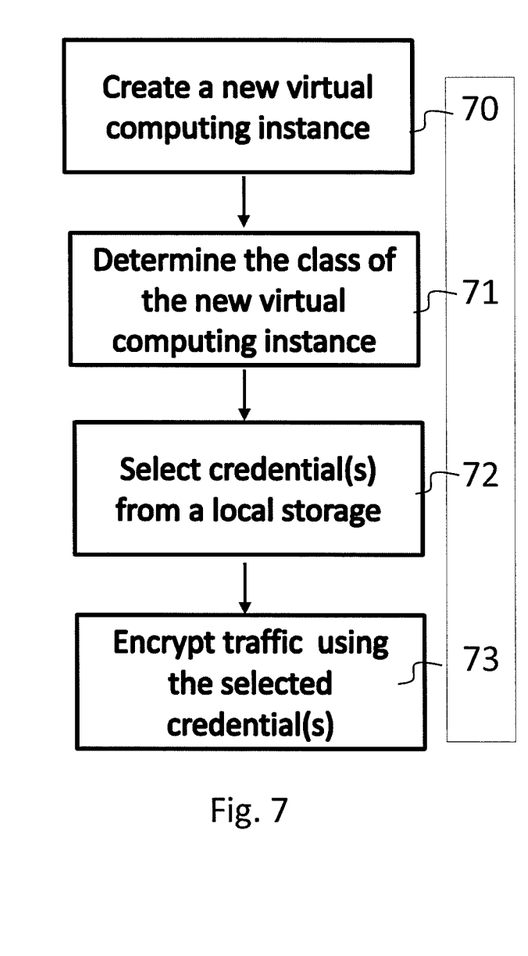

FIG. 7 shows another example for obtaining the security credentials such as keys. In this example, after creating at 70 a new virtual computing instance and determining the class of the new instance at 71, credentials are selected at 72 from available credentials and/or storages based on the determined class of the new instance and/or the identity of the new instance.

Selection of credentials may be made from a local storage. According to a possibility the selection is made from a remote storage. The class may determine whether the credentials should be obtained from a local or remote storage.

Traffic to and/or from the new instance can then be encrypted at 73 using the selected credential(s).

FIG. 8 shows an example of a method for securing data in virtualized environment where virtual computing instances interface a service platform operated on a physical computing apparatus. In the shown method a new virtual computing instance interfacing the service platform is created at 80. The created virtual instance belongs to a class of virtual computing instances, there being possibility to have a plurality of classes. At least one security credential is obtained at 82 from a storage of security credentials. The at least one security credential can be associated with the class of the new virtual computing instance. Alternatively, the class can determine a storage wherefrom to obtain the security credential(s).

Data communicated with at least one further computing instance can then be secured at 84 based on the obtained at least one security credential.

The class of the created new virtual computing instance can be determined after creation thereof. An identifier may be assigned for the new virtual computing instance, and the assigned identifier can be used in obtaining the at least one security credential from a storage of security credentials. The identifier mat be determined based on the class of the new virtual computing instance. The at least one security credential can obtained from a storage of security credentials provided in connection with the service platform and/or from a storage of security credentials provided remotely from the service platform.

A credential may be selected from a storage based on a class determined to be associated with the created virtual computing instance. According to a possibility a storage of security credentials is selected amongst a plurality of storages based on knowledge of the at least one security credential associated with the class. According to a possibility the storage is selected directly based on the class of the new virtual computing instance, and a request for a credential is directed to such storage. For example, if there is an association between a security credential and a class of a new virtual computing instance, such security credential may also be requested based on knowledge of where such security credentials are stored, the selected storage being also associated with the class.

A security credential may comprise one of a key, a SSH key, a certificate, and a private key-public key pair. It is noted that in addition the encryption, the security credential can be obtained and used for other purposes such as authentication and signing. The signing can comprise ensuring that the data content has not been changed.

A control group identifier or pod identifier may be used in selecting the at least one credential. The control group identifier may comprise a cgroup id.

Information about the selected or otherwise obtained keys or other security credentials may be exchanged with the other party.

According to an example, connections which exist between containers are determined. This information can be obtained from the orchestration system (e.g., using a plugin). In some cases (e.g., Docker™ EXPOSE) a port can be made available on the host. The connections can be specified in the orchestration system, possibly involving names dynamically defined in a domain name service (DNS) accessible to the containers and used to resolve names to connect to. An example of this can be found at http://kubernetes.io/docs/admin/dns/.

A possibility is to automatically encrypt every connection. This can necessitate a need to determine (based on IP address) which connections are internal to the system and which go out from the cloud, so that only those internal to the cloud would be encrypted.

Encryption keys may need to be managed centrally, at least for each host, and preferably for each container, so that each connection is encrypted and authenticated using the proper encryption key for that container. This can be provided e.g. using an X.509 certificate and a private key for each host/container. The TCP/IP and UDP connections between containers can be captured and wrapped in either Internet Protocol Security (IPSec) or transport layer security (TLS), transparently to the applications being run in the containers. The capture can be done e.g. in any of the following ways:

1. TCPWrappers-like functionality. Although this works satisfactorily in certain scenarios a problem in using such functionality can be that it may not be possible to easily modify what is inside containers in all scenarios, and the containers will directly call Linux system calls.
2. Using a Kernel module to intercept the connect( ) system call (and send( ) system call for UDP). A kernel module can be adapted to intercept system calls. A system call is a programmatic way in which a computer program requests a service from the kernel of the operating system it is executed on. This may include hardware-related services (for example, accessing a hard disk drive), creation and execution of new processes, and communication with integral kernel services such as process scheduling. System calls provide an essential interface between a process and the operating system. The kernel module can implement the necessary encryption. It may be easier to have the kernel module to communicate with a user-mode policy manager connected to an IKE key manager, using a suitable socket or device object or mapped memory for kernel-user space communication.
3. nftables may also be used to capture the connection and either handle it in the kernel or NAT it to a user-mode process. This captures connections on packet level, as opposed to capturing connection initiation in the kernel module system call interception approach. Otherwise this may similarly trigger a user-mode process to negotiate IPSec before letting the packet go through.
4. A possibility is to use a data plane development kit (DPDK), for example Intel™ DPDK or similar technology. The DPDK is a set of data plane libraries and network interface controller drivers for fast packet processing, currently managed as an open-source project under the Linux Foundation.

However, use of TLS transparently outside the container may be problematic. A kernel module approach is a viable option as in here the data is provided as a stream. It is thus possible to pass the data back to user mode for TLS processing.

Using essentially host-to-host IPSec is a relatively simple and efficient way for providing this. The encryption can be automatically triggered by the first packet going to the host. It is possible to configure the Internet Key Exchange (IKE) to do that without any special capture functionality.

Having separate keys for each container can also be problematic in certain occasions. First, it may need to be identified which container is sending the packet/initiating the connection. Then the certificate and private key for that container may need to be fetched and the connection initiated. According to an aspect control group (cgroup) identity (id) can be as a key to select the appropriate certificate and key. A cgroup id can be obtained in kernel mode from an storage function. For example, the identity information can be directly readable from a process data structure. The cgroup id can be passed to the user mode process. IKE implementation can be modified to use the cgroup id as one of the selectors for selecting a security association and related credentials.

Private keys and certificates, or other appropriate credentials, can be stored locally on the host. Storage can also be arranged externally, e.g. based on Hardware Security Module (HSM) or Maazon key store or a security server. The storage can be provided in a container metadata. This can be managed by the orchestration system. A possibility is to provision the data as secrets to the container.

According to an aspect the secrets e.g. keys are provided inside the container whereas the encryption happens outside the container in the kernel using the container specific keys.

According to an aspect a path of least resistance for host-to-host encryption using per-host keys may be provided. In here keys and certificates are created and trusted roots are configured for hosts when more hosts are added. The keys and certificates can be managed outside the provisioning system. A system for renewing the certificates may be implemented. Simple internal certificate authority (CA) for issuing the certificates may also be provided. Existing open source code may be used for implementing at least some parts of this. IKE/policy manager may be configured to negotiate a separate SA (security association) for each host peer. This may require configuring a separate rule for each host, or might be configurable on a per-network basis depending on IKE/policy manager implementation.

The configuration and key management and related scripts (the system) can be provided in the context of a cloud service. The proposed arrangement can be combined with a SDP based architecture.

According to another aspect a path of least resistance for host-to-host encryption using per-container keys is provided. A loadable kernel module can be arranged to intercept connect( ), send( ), and other system calls, send a request to user mode, and only continue processing of the system call once the user mode process indicates an SA is up for the destination. A hash table of IP addresses may be provided in the kernel to cache this status. A cgroup id may already be available in kernel IKE implementation for policy decisions. Small kernel patches may be used to provide this.

IKE can negotiate a separate SA for each connection (source port:dst host:dst port). Port selectors may be configured to be supported by IPSec implementation.

According to an aspect a cgroup id can be used as a selector in IPSec and policy manager/IKE. A higher level identifier may also be used for this. For example, the selection may be based on a Pod id. There are different ways of determining the cgroup id.

The SDP model can be overlaid on top of what is described here, and used for certificate/key distribution, trusted root distribution, and determining which hosts to encrypt to.

According to certain aspects encryption between containers is fully transparent for the containers. The encryption can happen automatically.

In an alternative embodiment, the credentials are transferred to the virtual computing instance, and the data is encrypted by the virtual computing instance using the credentials.

The system can handle hosts in multiple locations and at different cloud vendors. This includes hosts located on-premises and hosts at a different cloud service provider.

The arrangement may be used to ensure that all data communicated in the Ethernet is secured.

Figure 9:
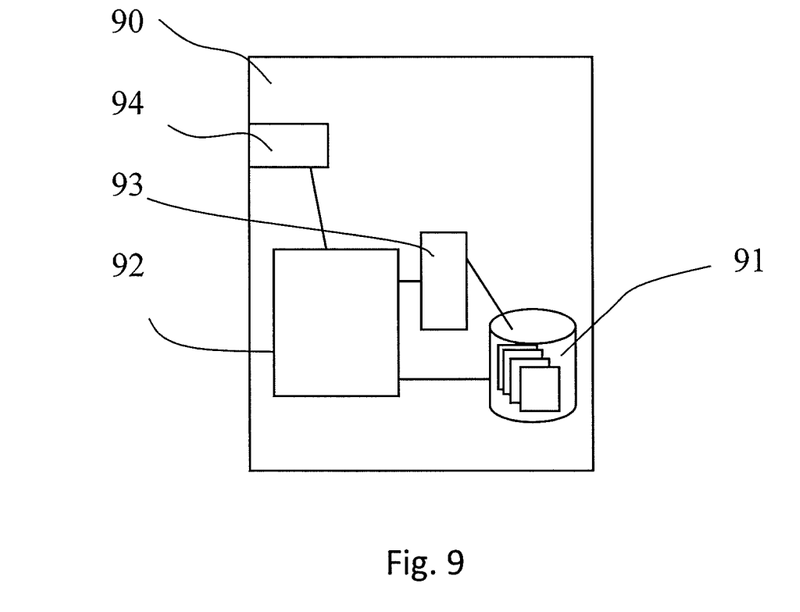
FIG. 9 shows an example of a physical computing apparatus.

FIG. 9 shows an example of control apparatus for hardware providing the necessary physical data processing apparatus to implement the above described embodiments. The control apparatus 90 can, for example, provide the hardware (HW) layer 19 functions of FIGS. 3 and 4, and the operation of any of the flowcharts of FIGS. 5-8. The control apparatus 90 can be arranged to provide the necessary physical data computing functions for the control of communication sessions, encryption, credentials and any additional information. The apparatus may also provide other security operations such as authentication and signing based at least in part on credentials from the security credential storage. A control apparatus can determine which key(s) or other credentials are needed for the access and other operations. For these purposes the control apparatus comprises at least one memory 91, at least one data processing unit 92, 93 and at least one input/output interface 94. Via the interface the control apparatus can be coupled to other entities of the respective device. The control apparatus can be configured to execute an appropriate software code to provide the control functions. The control apparatus can also be interconnected with other control entities.

Means for providing a security function in a virtualized environment can comprise an appropriate data processing, credential storage and interface arrangement as described herein. For example, the means can be configured to provide the steps of any of the flowcharts of FIGS. 5-8.

The various embodiments and their combinations or subdivisions may be implemented as methods, apparatuses, or computer program products, and operated at least partially in virtual environment. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules.

A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in various combinations in, as non-limiting examples, hardware, software, firmware, special purpose circuits or logic, general purpose hardware or controller or other computing devices, or some combination thereof.

The various aspects and features discussed above can be combined in manners not specifically shown by the drawings and/or described above.

The foregoing description provides by way of exemplary and non-limiting examples a full and informative description of exemplary embodiments and aspects of the invention. However, various modifications and adaptations falling within the spirit and scope of this disclosure may become apparent to those skilled in the relevant arts in view of the foregoing description, when read in conjunction with the accompanying drawings and the appended claims.

The invention claimed is:

1. A method of securing data in virtualized environment providing operating system level virtualization where virtual computing instances operate on a service platform provided by a shared operating system resource operated on a physical computing apparatus, the method comprising:

maintaining, in a storage of security credentials associated with the service platform provided by the shared operating system resource, security credentials that are assigned to be available for the given service platform provided by the shared operating system resource when needed and ready for use by new virtual computing instances operated on the service platform provided by the shared operating system resource and belonging to different classes of virtual computing instances, creating, by the computing apparatus, at least one new virtual computing instance on the service platform provided by the shared operating system resource, determining, by the computing apparatus and for the at least one new virtual computing instance, a class of virtual computing instances, selecting, by the computing apparatus and based on the class of virtual computing instances determined for the at least one new virtual computing instance, at least one of the security credentials assigned to be available for the given service platform provided by the shared operating system resource, in the storage of security credentials, and for selection for the determined class of virtual computing instances, obtaining, by the computing apparatus and from the storage of security credentials, the selected at least one security credential, and securing, by the computing apparatus, data communicated by the at least one new virtual computing instance operated on the service platform provided by the shared operating system resource with at least one other computing instance based on the selected at least one security credential obtained from the storage of security credentials.

2. The method according to claim 1, comprising determining the class of virtual computing instances after creation of the at least one new virtual computing instance.

3. The method according to claim 1, comprising assigning an identifier for the at least one new virtual computing instance and using the assigned identifier in obtaining the selected at least one security credential from the storage of security credentials.

4. The method according to claim 3, comprising determining the identifier based on the class of virtual computing instances determined for the at least one new virtual computing instance.

5. The method according to claim 1, wherein the storage of security credentials is provided in connection with the service platform.

6. The method according to claim 1, wherein the at least one new virtual computing instance comprises a container, the method comprising encrypting data communicated by the container with at least one further virtual computing instance based on the selected at least one security credential.

7. The method according to claim 6, wherein the at least one further virtual computing instance comprises a further container.

8. The method according to claim 7, wherein the further container runs on the same service platform provided part by the shared operating system resource.

9. The method according to claim 7, wherein the further container runs on a different service platform provided at least in part by a different shared operating system resource.

10. The method according to claim 1, wherein the selected at least one security credential comprises one of a key, a Secure Shell (SSH) key, a certificate, or a private key —public key pair.

11. The method according to claim 1, wherein the securing the data communicated by the at least one new virtual computing instance operated on the service platform provided by the shared operating system resource with the at least one other computing instance comprises at least one of an encrypting operation, an authentication operation, and/or a signing operation based on the selected at least one security credential.

12. The method according to claim 1, wherein the class of virtual computing instances is determined for the at least one new virtual computing instance based on at least one of a grouping of virtual computing instances, a type of virtual computing instances, a type of access rights of virtual computing instances, ownership of a relevant computing resource, or information about a host opening the at least one new virtual computing instance and/or a host calling for the at least one new virtual computing instance.

13. The method according to claim 1, comprising using a control group identifier or a pod identifier in selecting the at least one security credential.

14. The method according to claim 13, wherein the control group identifier comprises a cgroup id.

15. The method according to claim 1, wherein the storage of security credentials is provided remotely from the service platform.

16. An apparatus comprising at least one processor and at least one memory including computer program code, wherein the at least one memory and the computer program code are configured, with the at least one processor, to cause the apparatus to:

provide operating system level virtualization where virtual computing instances operate on a service platform provided by a shared operating system resource, connect to a storage of security credentials associated with the service platform provided by the shared operating system resource and configured to maintain security credentials assigned to be available for the given service platform when needed and ready for use by new virtual computing instances operated on the service platform and belonging to different classes of virtual computing instances, create at least one new virtual computing instance sharing the operating system resource of the service platform, determine a class of virtual computing instances for the at least one new virtual computing instance, select, based on the class of virtual computing instances determined for the at least one new virtual computing instance sharing the operating system resource of the service platform, at least one of the security credentials assigned to be available for the given service platform provided by the shared operating system resource, in the storage of security credentials, and for selection for the determined class of virtual computing instances, obtain, from the storage of security credentials, the selected at least one security credential, and secure data communicated between the at least one new virtual computing instance sharing the operating system resource of the service platform and at least one further computing instance based on the selected at least one security credential obtained from the storage of security credentials.

17. The apparatus according to claim 16, further configured to at least one of:

determine the class of virtual computing instances for the at least one new virtual computing instance after creation of the at least one new virtual computing instance, select the storage of security credentials based on knowledge of at least one security credential associated with the class of virtual computing instances determined for the at least one new virtual computing instance, select the storage of security credentials based on the class of virtual computing instances determined for the at least one new virtual computing instance, assign an identifier for the at least one new virtual computing instance and use the assigned identifier in obtaining the selected at least one security credential from the storage of security credentials, or determine an identifier for the at least one new virtual computing instance based on the class of virtual computing instances determined for the at least one new virtual computing instance.

18. The apparatus according to claim 16, wherein the storage of security credentials is provided in connection with the service platform.

19. The apparatus according to claim 16, wherein the at least one new virtual computing instance comprises a container, the apparatus being configured to encrypt data communicated with at least one further virtual computing instance based on the selected at least one security credential.

20. The apparatus according to claim 16, configured to classify the at least one new virtual computing instance into the class of virtual computing instances based on at least one of a grouping of virtual computing instances, a type of virtual computing instances, a type of access rights of the at least one new virtual computing instance, ownership of a relevant computing resource, or information about a host opening the at least one new virtual computing instance and/or a host calling for the at least one new virtual computing instance.

21. The apparatus according to claim 16, wherein the storage of security credentials is remote from the service platform.

22. A non-transitory computer readable media comprising program code for a particular apparatus providing operating system level virtualization where virtual computing instances operate on a service platform provided by a shared operating system resource operated on a physical computing apparatus, the particular apparatus comprising a processor, wherein the program code when executed by the processor causes the processor to perform:

connecting to a storage of security credentials associated with the service platform provided by the shared operating system resource and configured to maintain security credentials assigned to be available for the given service platform when needed and ready for use by new virtual computing instances operated on the service platform and belonging to different classes of virtual computing instances, creating at least one new virtual computing instance on the service platform provided by the shared operating system resource, determining a class of virtual computing instances for the at least one new virtual computing instance, selecting, based on the class of virtual computing instances determined for the at least one new virtual computing instance, at least one of the security credentials assigned to be available for the given service platform provided by the shared operating system resource, in the storage of security credentials, and for selection for the determined class of virtual computing instances, obtaining, from the storage of security credentials, the selected at least one security credential, and securing data communicated by the at least one new virtual computing instance operated on the service platform provided by the shared operating system resource with at least one further computing instance based on the selected at least one security credential obtained from the storage of security credentials.

* * * * *

UNITED STATES PATENT AND TRADEMARK OFFICE
CERTIFICATE OF CORRECTION

PATENT NO. : 11,138,324 B2
APPLICATION NO. : 15/843236
DATED : October 5, 2021
INVENTOR(S) : Ylönen It is certified that error appears in the above-identified patent and that said Letters Patent is hereby corrected as shown below:

On the Title Page

Item (56), Column 2, Other Publications, Line 1:
Delete "Adam," and insert --Ádám,-- therefor In the Claims Column 11, Claim 8, Line 47:
After "provided", delete "part"

Signed and Sealed this
Twenty-ninth Day of November, 2022

Katherine Kelly Vidal
*Director of the United States Patent and Trademark Office*